March 1, 1927. 1,619,721
S. W. GREGERSEN
REPAIR GUARD FOR MOWERS AND THE LIKE
Filed June 3, 1925
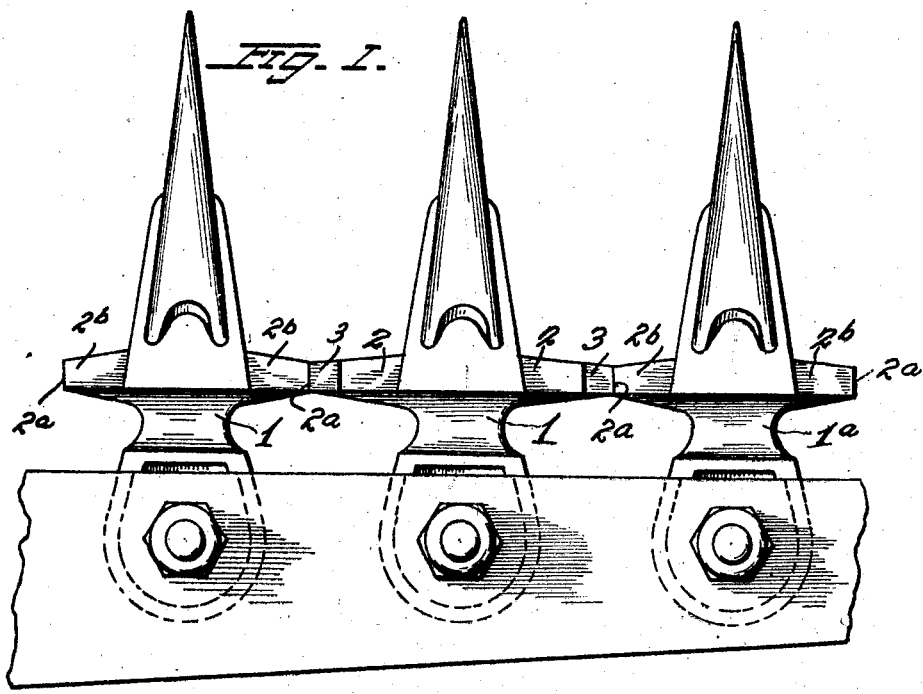
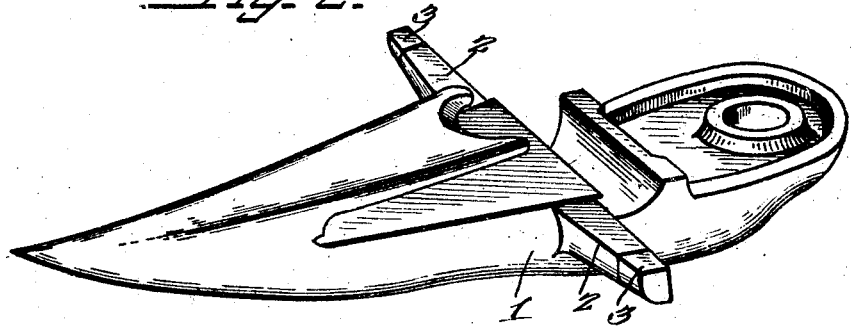
Inventor
S. W. Gregersen
By *[signature]*
Attorney Patented Mar. 1, 1927.

1,619,721

UNITED STATES PATENT OFFICE.

SIEGFRIED W. GREGERSEN, OF CROOKSTON, NEBRASKA.

REPAIR GUARD FOR MOWERS AND THE LIKE.

Application filed June 3, 1925. Serial No. 34,588.

The object of the invention is to provide a replacement or repair guard in which the spacer arms of the head are longer than usual, so that in the event of wear upon the arms of a particular guard, thus permitting movement of the same on the cutter bar, thereby causing wear on the extremities of other guards, the worn guard may be removed and the repair or replacement guard substituted.

With this object in view, the invention consists in a construction and combination of parts of which a preferred embodiment is illustrated in the accompanying drawings, wherein:

Figure 1 is a plan view of a section of a cutter bar showing the repair or replacement guard in position.

Figure 2 is a detail perspective view of the repair guard.

The repair or replacement guard 1 is identical in form with the usual guard 1ª but the lateral arms 2 of the latter are longer than normally having the terminal extensions 3 for end abutment with the extremities 2ª of the arms 2ᵇ of the guard 1ª.

In use with a mowing machine, a loose guard will be subjected to oscillatory or vibratory movement and its extremities rubbing against the extremities of adjacent arms results in wear of all, and if guards are to be replaced to take up for the wear, not only that guard which caused the wear but two adjacent ones must be replaced in order to have full abutting engagement between the several guards.

With the use of the present invention, the wear on a particular guard, despite the fact that it may have effected wear on adjacent guards, will necessitate only the replacement of the guard which caused the damage. The repair or replacement guard, having the longer arms, will fit snugly in the place of the worn guard after the adjacent ends of the two adjacent guards have been squared off with a suitable implement, preferably a file. Thus, the two additional guards, which under ordinary circumstances would have to be replaced, may be continued in use until one or the other of them shall itself have become so worn as to necessitate replacement by a repair guard.

A repair guard may be constructed from a worn guard by adding the extensions 3 to the ends of the arms of the latter and this may be done by welding or any acceptable means.

The invention having been described, what is claimed as new and useful is:

1. A sickle bar replacement guard having lateral arms, and terminal extensions secured to the extremities of the arms and in continuation thereof.

2. A sickle bar replacement guard having lateral arms, and an extension member welded to the extremity of each arm for abutting engagement with the worn extremity of the arm of an adjacent guard.

In testimony whereof he affixes his signature.

SIEGFRIED W. GREGERSEN.